(12) United States Patent
Li

(10) Patent No.: US 11,303,137 B2
(45) Date of Patent: *Apr. 12, 2022

(54) SYSTEMS AND METHODS FOR CONTROLLING BATTERY CURRENT

(71) Applicant: O2Micro Inc., Santa Clara, CA (US)

(72) Inventor: Guoxing Li, Sunnyvale, CA (US)

(73) Assignee: O2Micro Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/914,003

(22) Filed: Jun. 26, 2020

(65) Prior Publication Data

US 2020/0328601 A1 Oct. 15, 2020

Related U.S. Application Data

(63) Continuation of application No. 16/420,780, filed on May 23, 2019, now Pat. No. 10,714,947, which is a continuation of application No. 15/822,876, filed on Nov. 27, 2017, now Pat. No. 10,348,101.

(30) Foreign Application Priority Data

Mar. 10, 2017 (GB) ...................................... 1703872

(51) Int. Cl.
*H02J 7/00* (2006.01)
*H01M 10/42* (2006.01)
*H02J 7/04* (2006.01)

(52) U.S. Cl.
CPC ........... *H02J 7/0019* (2013.01); *H01M 10/42* (2013.01); *H01M 10/425* (2013.01); *H01M 10/4257* (2013.01); *H02J 7/007* (2013.01); *H02J 7/0013* (2013.01); *H02J 7/0071* (2020.01);
(Continued)

(58) Field of Classification Search
None
See application file for complete search history.

(56) References Cited

U.S. PATENT DOCUMENTS

| 3,895,283 | A | 7/1975 | Peterson |
| 5,148,043 | A | 9/1992 | Hirata et al. |
| 5,905,364 | A | 5/1999 | Hirotaka |

(Continued)

FOREIGN PATENT DOCUMENTS

| CN | 101383521 A | 3/2009 |
| CN | 101667741 A | 3/2010 |

(Continued)

*Primary Examiner* — Arun C Williams

(57) ABSTRACT

A battery system comprising multiple battery packs. A battery pack of the battery packs includes a battery, voltage sense circuitry, a control circuit, a control switch and current regulation circuitry. The voltage sense circuitry senses a battery voltage of the battery and an input voltage of the battery pack. The control circuit is coupled to the sense circuitry and is operable for adjusting a level of a reference signal based on attribute data associated with the battery pack and a difference between the battery voltage and the input voltage. The control switch is operable for passing a battery current flowing through the battery. The current regulation circuitry is coupled to the control circuit and the control switch, and is operable for controlling the control switch to regulate the battery current according to the reference signal.

19 Claims, 12 Drawing Sheets

(52) U.S. Cl.
CPC ........ *H02J 7/0072* (2013.01); *H02J 7/00714* (2020.01); *H02J 7/045* (2013.01); *H01M 2010/4271* (2013.01)

(56) References Cited

U.S. PATENT DOCUMENTS

| | | | |
|---|---|---|---|
| 5,982,643 | A | 11/1999 | Phlipot |
| 8,222,869 | B2 | 7/2012 | Li |
| 8,405,358 | B2 | 3/2013 | Li et al. |
| 9,030,171 | B2 | 5/2015 | Wu |
| 9,564,770 | B2 | 2/2017 | Kung |
| 10,348,101 | B2 | 7/2019 | Li |
| 10,714,947 | B2 | 7/2020 | Li |
| 2003/0141850 | A1 | 7/2003 | Dotzler et al. |
| 2005/0047181 | A1 | 3/2005 | Yamamoto et al. |
| 2005/0242779 | A1* | 11/2005 | Yoshio ............... B60L 58/21 320/134 |
| 2005/0249989 | A1* | 11/2005 | Pearson ............. H01M 8/0491 429/431 |
| 2005/0285445 | A1* | 12/2005 | Wruck ................. H02J 1/14 307/10.1 |
| 2006/0181244 | A1* | 8/2006 | Luo ................... H01M 10/441 320/128 |
| 2006/0232241 | A1 | 10/2006 | Lu et al. |
| 2007/0069807 | A1 | 3/2007 | Ho |
| 2011/0175578 | A1 | 7/2011 | Pagano |
| 2012/0013315 | A1 | 1/2012 | Popescu et al. |
| 2012/0025769 | A1 | 2/2012 | Kikuchi et al. |
| 2012/0065824 | A1 | 3/2012 | Takahashi et al. |
| 2014/0084871 | A1 | 3/2014 | Densham |

FOREIGN PATENT DOCUMENTS

| | | |
|---|---|---|
| CN | 104104124 A | 10/2014 |
| JP | 2009089499 A | 4/2009 |

* cited by examiner

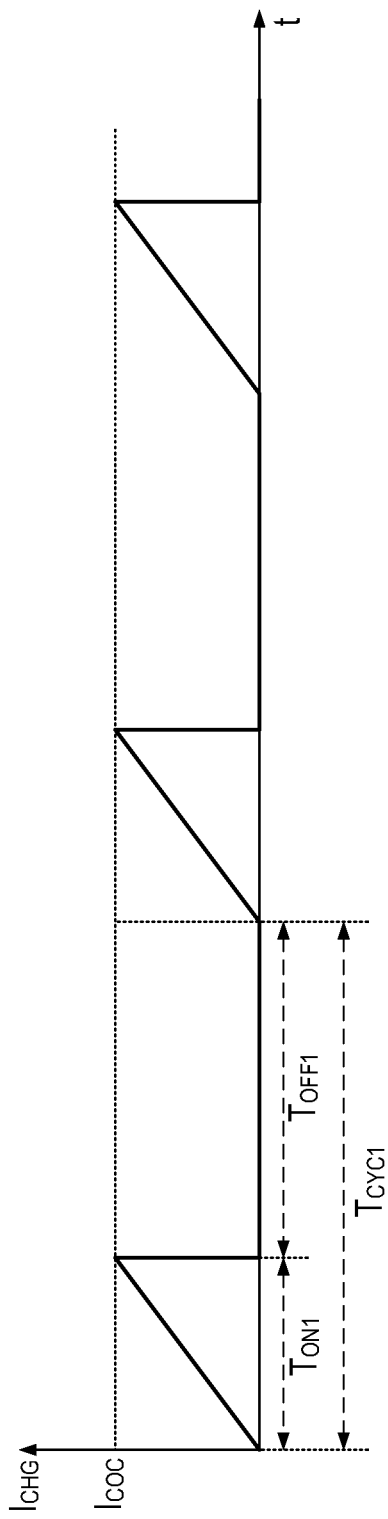
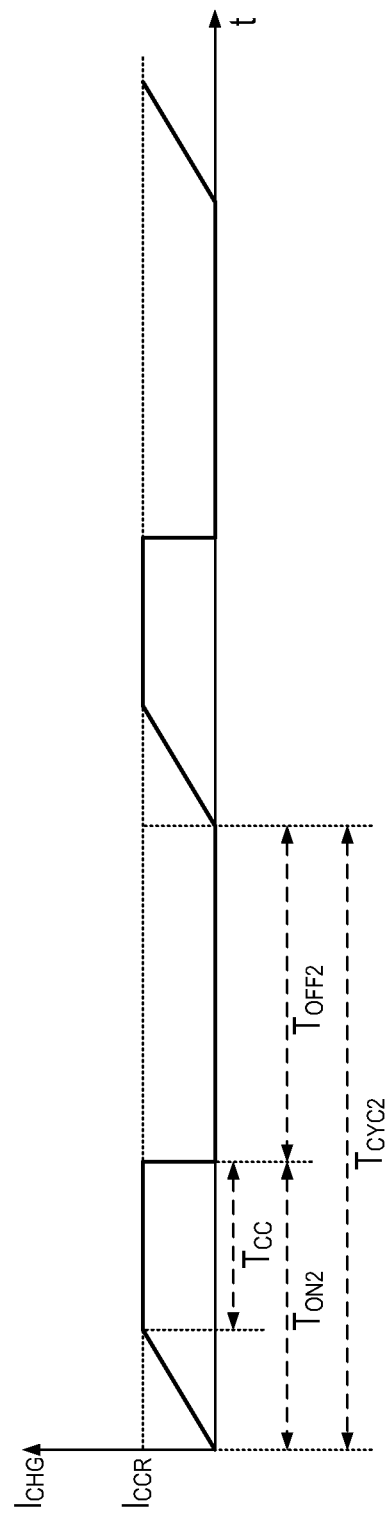

SYSTEMS AND METHODS FOR CONTROLLING BATTERY CURRENT

REFERENCE TO RELATED APPLICATIONS

This application is a Continuation Application of the commonly-owned U.S. patent application Ser. No. 16/420,780, now U.S. Pat. No. 10,714,947, filed on May 23, 2019, which is a Continuation Application of the commonly-owned U.S. patent Ser. No. 15/822,876, U.S. Pat. No. 10,348,101, filed on Nov. 27, 2017, which claims benefit under 35 U.S.C. § 119(a) to Application No. GB1703872.0, now Patent No. GB2545587, filed with the United Kingdom Intellectual Property Office on Mar. 10, 2017, which are hereby incorporated by reference in their entirety.

BACKGROUND

FIG. 1 illustrates a conventional battery management module 100. In the battery management module 100, if the battery voltage of the battery 102 is in a normal operation range, the battery management unit (BMU) 104 can turn on the charge switch $N_{CHG}$ to pass a normal charging current $I_{CHG}$ to charge the battery 102. If the battery voltage is below the normal operation range, e.g., the battery 102 is over-drained, then the BMU 102 turns on the pre-charge switch $P_{CHG}$ to pass a pre-charge current $I_{PCHG}$, e.g., trickle current, to charge the battery 102. The pre-charge resistor $R_{PCHG}$ coupled to the pre-charge switch $P_{CHG}$ has relatively high resistance to control the pre-charge current $I_{PCHG}$ to be relatively small, so as to protect the over-drained battery 102.

The battery management module 100 has some shortcomings. For example, the pre-charge current $I_{PCHG}$ can be given by: $I_{PCHG}=(V_{PACK+}-V_{BATT})/R_{PCHG}$, where $V_{PACK+}$ represents a voltage at the input terminal PACK+, and $V_{BATT}$ represents a voltage at the positive terminal of the battery 102. Thus, the pre-charge current $I_{PCHG}$ decreases if the battery voltage $V_{BATT}$ increases, and this slows down the pre-charging process. In addition, the pre-charge resistor $R_{PCHG}$ consumes additional power when the pre-charge current $I_{PCHG}$ flows therethrough. Moreover, the pre-charge resistor $R_{PCHG}$ and switch $P_{CHG}$ are high-power elements capable of sustaining a high voltage difference between the input voltage $V_{PACK+}$ and the battery voltage $V_{BATT}$, and therefore they are relatively expensive and increase the cost of the battery management module 100. Furthermore, the pre-charge resistor $R_{PCHG}$ and switch $P_{CHG}$ increase the PCB size for the battery management module 100.

A battery management module that addresses the above-mentioned shortcomings would be beneficial.

SUMMARY

A battery system comprising multiple battery packs. A battery pack of the battery packs includes a battery, voltage sense circuitry, a control circuit, a control switch and current regulation circuitry. The voltage sense circuitry senses a battery voltage of the battery and an input voltage of the battery pack. The control circuit is coupled to the sense circuitry and is operable for adjusting a level of a reference signal based on attribute data associated with the battery pack and a difference between the battery voltage and the input voltage. The control switch is operable for passing a battery current flowing through the battery. The current regulation circuitry is coupled to the control circuit and the control switch, and is operable for controlling the control switch to regulate the battery current according to the reference signal.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

FIG. 3A illustrates an example of a signal waveform of the battery management module in FIG. 2B, in an embodiment of the present invention.

FIG. 3B illustrates an example of a signal waveform of the battery management module in FIG. 2B, in an embodiment of the present invention.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
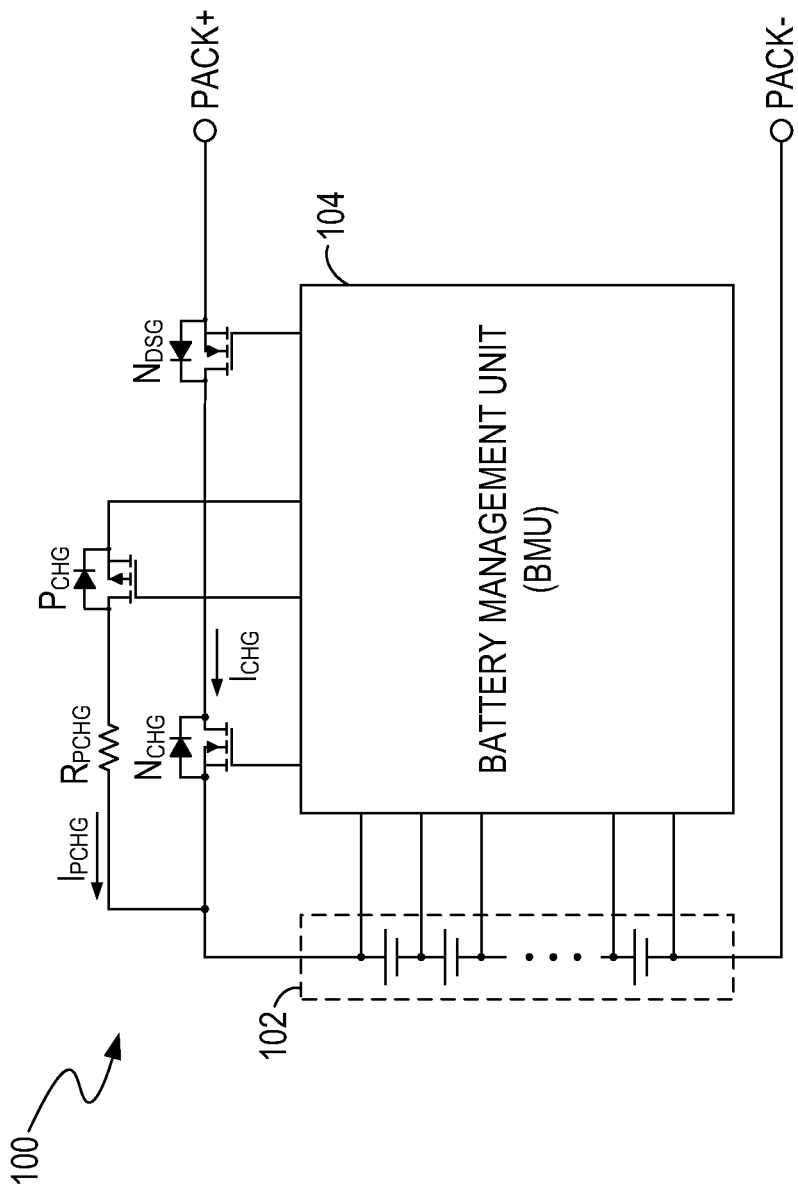
FIG. 1 illustrates a conventional battery management module topology.

In an embodiment of the present invention, a battery management module can control a charge switch to charge a battery according to the battery's status. For example, the battery management module can fully turn on the charge switch to operate in a normal charge mode if the battery voltage is in a normal operation range. The battery management module can also alternately turn on and off the charge switch to operate in a pre-charge mode if the battery voltage is below the normal operation range. In the pre-charge mode, the battery management module may increase a pre-charge current flowing through the charge switch as the battery voltage increases. As a result, compared with the conventional battery management module 100, the battery management module in an embodiment of the present invention can speed up the pre-charging process. Additionally, the pre-charge resistor $R_{PCHG}$ and switch $P_{CHG}$ mentioned in FIG. 1 are omitted, and therefore the battery management module in an embodiment of the present invention can consume less power, cost less, and has a smaller PCB size compared with the conventional battery management module 100.

Figure 2A:
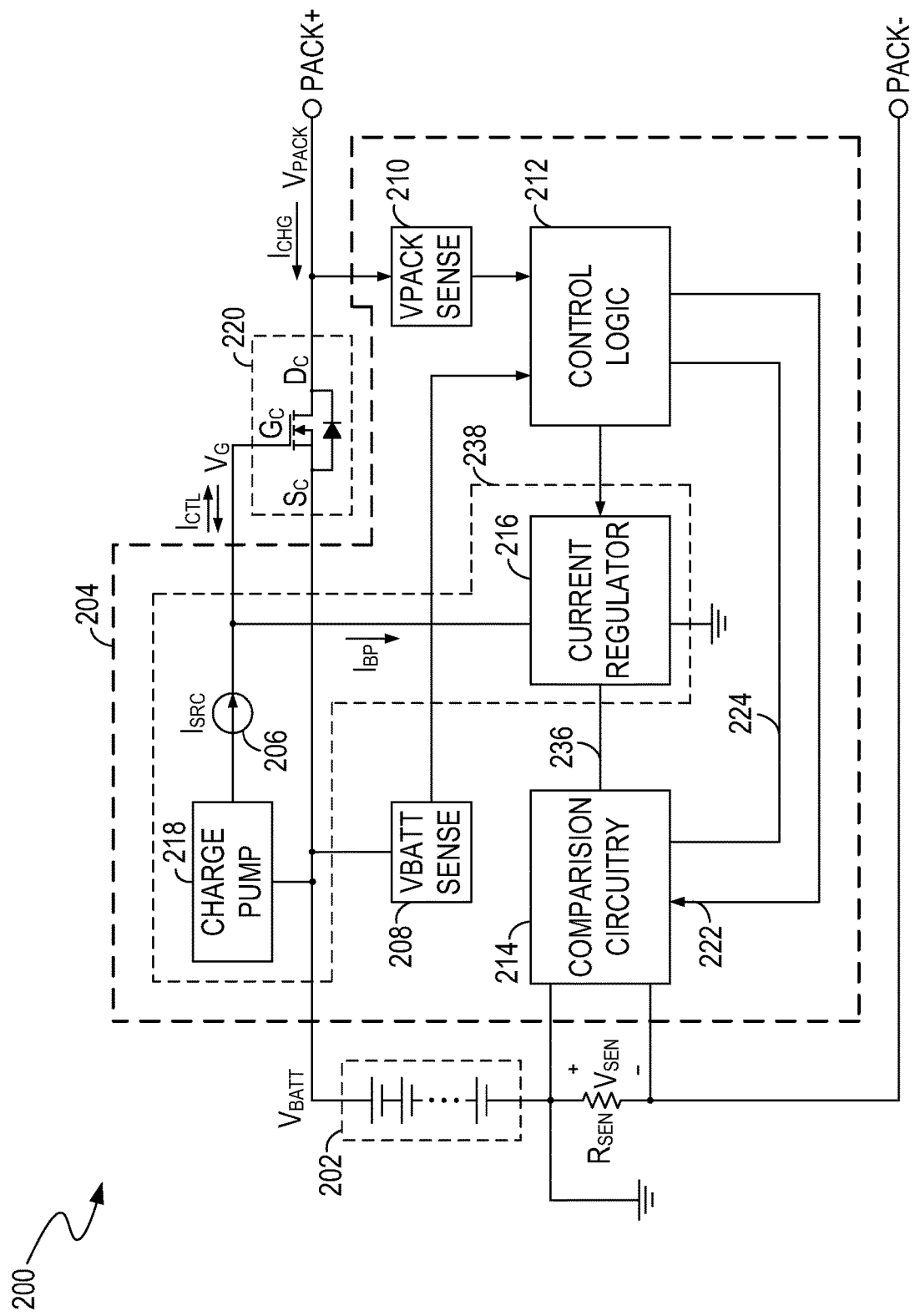
FIG. 2A illustrates an example of a battery management module topology, in an embodiment of the present invention.

FIG. 2A illustrates a topology of an example of a battery management module 200, in an embodiment of the present invention. The battery management module 200 can be integrated in a battery pack. In an embodiment, the battery management module 200 includes a battery 202 (e.g., including a plurality of battery cells), a control switch 220 (e.g., a charge switch or a discharge switch), a current sense element (e.g., including a resistor $R_{SEN}$), and a battery management unit (BMU) 204. In the example of FIG. 2A, the control switch 220, e.g., a charge switch, can pass a battery current $I_{CHG}$, e.g., a pre-charging current, from a power source (not shown) coupled to the input terminal PACK+ to charge the battery 202. The BMU 204 can receive a first sense signal $V_{SEN}$, e.g., a voltage signal indicative of the battery current $I_{CHG}$, from the sense resistor $R_{SEN}$, receive a second sense signal, indicative of a voltage $V_{BATT}$ of the battery 202, and control the control switch 220 according to the sense signals.

More specifically, in an embodiment, the BMU 204 includes comparison circuitry 214, current generating circuitry 238, a control circuit 212 (e.g., having a control logic residing thereon), a battery-voltage ($V_{BATT}$) sense circuit 208, and an input-voltage ($V_{PACK}$) sense circuit 210. The comparison circuitry 214 can compare the sense signal $V_{SEN}$ with a reference signal 222 to generate a comparison result at, e.g., the signal line 236 and/or the signal line 224. The current generating circuitry 238 can generate a control current $I_{CTL}$, according to the comparison result, to charge or discharge a control terminal $G_C$ of the control switch 220 thereby adjusting the battery current $I_{CHG}$ to have a target average level. By way of example, the control switch 220 includes a field-effect transistor, e.g., a metal-oxide semiconductor field-effect transistor, and the control terminal $G_C$ includes a gate terminal of the field-effect transistor. The control current $I_{CTL}$ can charge the gate terminal $G_C$ to increase the gate voltage $V_G$ of the control switch 220 and partially turn on the switch 220, thereby increasing the battery current $I_{CHG}$. The control current $I_{CTL}$ can also discharge the gate terminal $G_C$ to reduce the gate voltage $V_G$ thereby turning off the control switch 220 to disable/cutoff the battery current $I_{CHG}$. Thus, an average level of the battery current $I_{CHG}$ can be adjusted by adjusting the control current $I_{CTL}$. The abovementioned comparison result can be provided to the current generating circuitry 238 to adjust the control current $I_{CTL}$ such that the battery current $I_{CHG}$ is adjusted to have a target average level.

Additionally, in an embodiment, the control circuit 212 monitors the battery current $I_{CHG}$, battery voltage $V_{BATT}$, and input voltage $V_{PACK+}$ via the sense resistor $R_{SEN}$ and sense circuits 208 and 210, and controls the target average level according to the monitored information. By way of example, the current generating circuitry 238 can enable the battery current $I_{CHG}$ to flow through the battery 202 in a first time interval $T_{ON}$ by charging the control terminal $G_C$, disable/cutoff the battery current $I_{CHG}$ in a second time interval $T_{OFF}$ by discharging the control terminal $G_C$, and alternately enable and disable the battery current $I_{CHG}$ according to the monitored battery current $I_{CHG}$. The control circuit 212 can increase a ratio of the first time interval to a sum $T_{CYC}$ (e.g., $T_{CYC}=T_{ON}+T_{OFF}$) of the first and second time intervals, e.g., $T_{ON}/T_{CYC}$, thereby increasing the target average level if the battery voltage $V_{BATT}$ increases or if a difference between the battery voltage $V_{BATT}$ and the input voltage $V_{PACK+}$ decreases.

Thus, the time for the pre-charge process, e.g., during which the battery voltage $V_{BATT}$ increases from an overdrained voltage level to a voltage level in a normal operation range of the battery 202 in the battery management module 200 can be less than that in the conventional battery management module 100. Additionally, the pre-charge resistor $R_{PCHG}$ and switch Polo mentioned in FIG. 1 can be omitted in the battery management module 200, and therefore the battery management module 200 can consume less power, cost less, and has a smaller PCB size compared with the conventional battery management module 100.

In an embodiment, the current generating circuitry 238 includes a current source 206, a charge pump 218, and a current regulator 216. The current source 206 can generate a preset current $I_{SRC}$ to charge the control terminal $G_C$. In an embodiment, the current source 206 can have an arbitrary structure as long as the current source 206 is capable of providing a preset current. For example, the current source 206 may include a current mirror. For another example, the current source 206 may include a resistive element (e.g., a resistor) having a preset voltage applied thereon. For yet another example, the current source 206 may include a field-effect transistor having a preset gate-source voltage applied thereon. For yet another example, the current source 206 may include an operational transconductance amplifier (OTA) having a preset differential input voltage applied thereon. In an embodiment, the charge pump 218 can provide a supply voltage, greater than the battery voltage $V_{BATT}$, to power the current source 206. Additionally, the current regulator 216 can sink at least a portion of the preset current $I_{SRC}$ to regulate the control current $I_{CTL}$ according to the comparison result from the comparison circuitry 214. For example, if the comparison result indicates that the battery current $I_{CHG}$ is less than a reference current level, e.g., indicated by the abovementioned reference signal 222, then the current regulator 216 can be turned off and allow the present current $I_{SRC}$ charge to the control terminal $G_C$. If the comparison result indicates that the battery current $I_{CHG}$ is greater than the reference current level, then the current regulator 216 generates a sink current $I_{BP}$ to sink at least a portion of the preset current $I_{SRC}$. In an embodiment, the control current $I_{CHG}$ can charge the control terminal $G_C$ to increase the battery current $I_{CHG}$ if the sink current $I_{BP}$ is less than the preset current $I_{SRC}$. The control current $I_{CTL}$ can also discharge the control terminal $G_C$ to reduce the battery current $I_{CHG}$ if the sink current $I_{BP}$ is greater than the preset current $I_{SRC}$. The control current $I_{CTL}$ can also terminate charging and discharging of the control terminal $G_C$ to maintain the battery current $I_{CHG}$ if the sink current $I_{BP}$ remains at the level of the preset current $I_{SRC}$. Thus, the current regulator 216 can regulate the battery current $I_{CHG}$ by controlling the sink current $I_{BP}$.

Figure 2B:
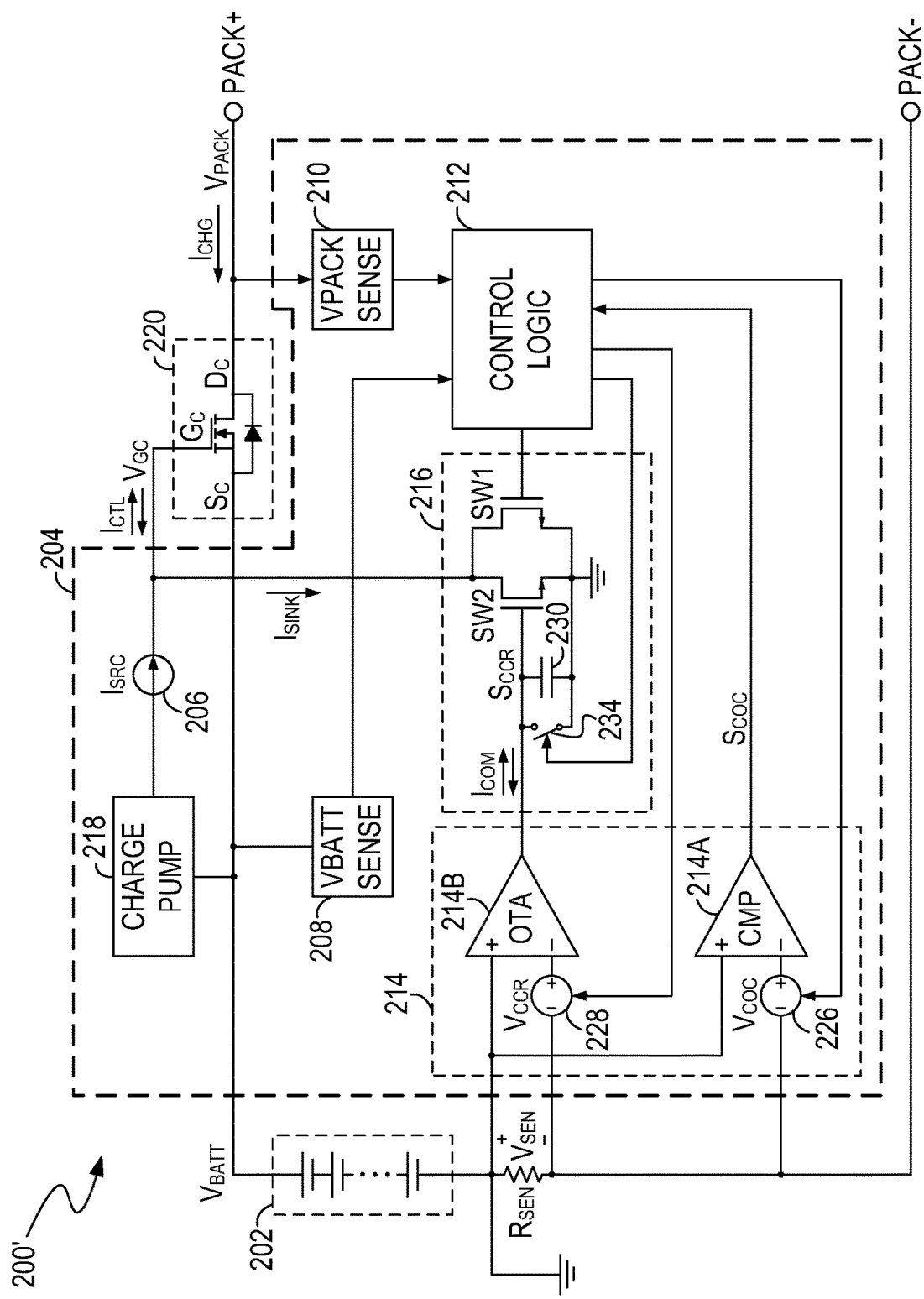
FIG. 2B illustrates an example of a battery management module topology, in an embodiment of the present invention.

FIG. 2B illustrates circuit diagrams of examples of the current regulator 216 and the comparison circuitry 214, in an embodiment of the present invention. FIG. 2B is described in combination with FIG. 2A. As shown in FIG. 2B, the current regulator 216 includes a first switch SW1, a second switch SW2 (e.g., including a metal-oxide-semiconductor field-effect transistor), a compensation capacitor 230, and a discharge switch 234, and the comparison circuitry 214 includes a comparator 214A, an amplifier 214B, e.g., an operational transconductance amplifier (OTA), and reference voltage sources 226 and 228. In an embodiment, the battery management module 200' can selectively operate in a first mode or a second mode according to the sense resistance $R_{SEN}$. By way of example, if the sense resistance $R_{SEN}$ is too small, e.g., smaller than specified resistance, then the battery management module 200' operates in the first mode, and the control circuit 212 cooperates with the comparator 214A and the switch SW1 to adjust the battery current $I_{CHG}$. If the sense resistance $R_{SEN}$ is not too small, e.g., greater than specified resistance, then the battery management module 200' operates in the second mode, and the control circuit 212 cooperates with the amplifier 214B and the switch SW2 to adjust the battery current $I_{CHG}$.

More specifically, in the first mode in an embodiment, the voltage source 226 provides a first reference voltage $V_{COC}$, and the comparator 214A compares the sense signal $V_{SEN}$ with the reference voltage $V_{COC}$ to generate a comparison result $S_{COC}$, e.g., a logic signal. If the sense signal $V_{SEN}$ is greater than the reference voltage $V_{COC}$, then the comparison result $S_{COC}$ can cause the control circuit 212 to turn on the switch SW1. In an embodiment, when both the switches SW1 and SW2 are turned off, the preset current $I_{SRC}$ can charge the control terminal $G_C$ to increase the battery current $I_{CHG}$. When the switch SW1 is turned on, the switch SW1 can sink the preset current $I_{SRC}$ and discharge the control terminal $G_C$. In one such embodiment, the control circuit 212 can alternately turn on and off the switch SW1 thereby adjusting the battery current $I_{CHG}$ to have a target average level.

In the second mode in an embodiment, the voltage source 228 provides a second reference voltage $V_{CCR}$, and the amplifier 214B generates a compensation current $I_{COM}$ according to a difference between the sense signal $V_{SEN}$ and the reference signal $V_{CCR}$, to charge or discharge the compensation capacitor 230 to control a regulation signal $S_{CCR}$. The regulation signal $S_{CCR}$ can also be controlled by turning on the discharge switch 234. The regulation signal $S_{CCR}$ includes a voltage on the capacitor 230 that controls a gate-source voltage of the switch SW2. For example, if the sense signal $V_{SEN}$ is greater than the reference signal $V_{CCR}$, then the amplifier 214B outputs a current $I_{COM}$ to charge the compensation capacitor 230 to increase the regulation signal $S_{CCR}$. If the sense signal $V_{SEN}$ is less than the reference signal $V_{CCR}$, then the amplifier 214B draws in a current $I_{COM}$ to discharge the compensation capacitor 230 to reduce the regulation signal $S_{CCR}$. If the sense signal $V_{SEN}$ is equal to the reference signal $V_{CCR}$, then the amplifier 214B neither charges nor discharges the compensation capacitor 230 to maintain the regulation signal $S_{CCR}$. If the discharge switch 234 is turned on, the compensation capacitor 230 can be discharged to pull down the regulation signal $S_{CCR}$. In an embodiment, the switch SW2 can pass a sink current $I_{SINK}$, e.g., from the current source 206 to a low-voltage terminal (e.g., reference ground), to sink at least a portion of the preset current $I_{SRC}$ under control of the regulation signal $S_{CCR}$. For example, the sink current $I_{SINK}$ increases if the regulation signal $S_{CCR}$ increases, decreases if the regulation signal $S_{CCR}$ decreases, or remains unchanged if the regulation signal $S_{CCR}$ remains unchanged. Additionally, the control current $I_{CY}$ can charge the control terminal $G_C$ to increase the battery current $I_{CHG}$ if the sink current $I_{SINK}$ is less than the preset current $I_{SRC}$, or discharge the control terminal $G_C$ to reduce the battery current $I_{CHG}$ if the sink current $I_{SINK}$ is greater than the preset current $I_{SRC}$. In one such embodiment, the control circuit 212 can increase or decrease the regulation signal $S_{CCR}$ thereby adjusting the battery current $I_{CHG}$ to have a target current level.

In the example of FIG. 2B, the battery management module 200' includes switches SW1 and SW2, the comparator 214A, and the amplifier 214B, and therefore the battery management module 200' is compatible with more battery packs having different current sense resistors. However, the invention is not so limited. In another embodiment, the battery management module can include the switch SW1 and the comparator 214A and does not include the switch SW2 and the amplifier 214B. In yet another embodiment, the battery management module can include the switch SW2 and the amplifier 214B, and does not include the switch SW1 and the comparator 214A.

FIG. 3A illustrates an example of a signal waveform for the battery current $I_{CHG}$ in an abovementioned first mode, in an embodiment of the present invention. FIG. 3A is described in combination with FIG. 2A and FIG. 2B. In the example of FIG. 3A, during the first time interval $T_{ON1}$, the battery current $I_{CHG}$ is in a range determined by the reference signal $V_{COC}$, e.g., the battery current $I_{CHG}$ is less than a first reference current level $I_{COC}$ given by: $I_{COC}=V_{COC}/R_{SEN}$. Thus, the switch SW1 is turned off, and the control current $I_{CTL}$ charges the control terminal $G_C$ of the control switch 220 to increase the battery current $I_{CHG}$. When the battery current $I_{CHG}$ increases to be out of the range, e.g., the battery current $I_{CHG}$ is equal to or greater than the current level $I_{COC}$, the comparison result $S_{COC}$ controls the control circuit 212 to turn on the switch SW1. Hence, the control current $I_{CTL}$ discharges the control terminal $G_C$ to turn off the control switch 220. During the second time interval $T_{OFF1}$, the battery current $I_{CHG}$ decreases to, e.g., zero amperes. Thus, the average level $I_{AVE}$ of the battery current $I_{CHG}$ can be given by: $I_{AVE}=0.5I_{COC} \times T_{ON1}/T_{CYC1}$, where $T_{CYC1}$ represents a cycle period of the battery current $I_{CHG}$, e.g., a sum of the time intervals $T_{ON1}$ and $T_{OFF1}$.

In an embodiment, the control circuit 212 adjusts the ratio $T_{ON1}/T_{CYC1}$ thereby adjusting the average level $I_{AVE}$. For example, the control circuit 212 can increase the ratio $T_{ON1}/T_{CYC1}$ (e.g., reduce the cycle period $T_{CYC1}$) thereby increasing the average current $I_{AVE}$ if the battery voltage $V_{BATT}$ increases or if a difference between the battery voltage $V_{BATT}$ and the input voltage $V_{PACK+}$ decreases. In another embodiment, the control circuit 212 adjusts the reference voltage $V_{COC}$ thereby adjusting the average level $I_{AVE}$. For example, the control circuit 212 can increase the reference voltage $V_{COC}$ to increase the average level $I_{AVE}$ if the battery voltage $V_{BATT}$ increases. As a result, the time for the pre-charge process in embodiments of the present invention can be less than that in the conventional pre-charge process described in relation to FIG. 1.

In an embodiment, the sense resistance $R_{SEN}$ may be relatively small, e.g., smaller than specified resistance. Advantageously, in the abovementioned first mode, the battery management module 200' can adjust the battery current $I_{CHG}$ relatively accurately even if the resistance $R_{SEN}$ is relatively small. It is because the comparison result $S_{COC}$ is generated by comparing the peak voltage level of the sense signal $V_{SEN}$ (e.g., indicative of the peak current level of the battery current $I_{CHG}$) with the reference voltage $V_{COC}$, and the peak voltage level can be high enough to control the comparator 214A relatively accurately even if the resistance of the sense resistor $R_{SEN}$ is relatively small.

FIG. 3B illustrates an example of a signal waveform for the battery current $I_{CHG}$ in an abovementioned second mode, in an embodiment of the present invention. FIG. 3B is described in combination with FIG. 2A and FIG. 2B. In the example of FIG. 3B, during a first time interval $T_{ON2}$, the battery current $I_{CHG}$ is in a range determined by the reference signal $V_{CCR}$, e.g., the battery current $I_{CHG}$ is less than a second reference current level $I_{CCR}$ given by: $I_{CCR}=V_{CCR}/R_{SEN}$. Thus, the switch SW2 is turned off, and the control current $I_{CTL}$ charges the control terminal $G_C$ of the control switch 220 to increase the battery current $I_{CHG}$. When the battery current $I_{CHG}$ increases to be out of the range, e.g., the battery current $I_{CHG}$ is equal to or greater than the current level $I_{CCR}$, the control current $I_{CTL}$ can terminate the charging of the control terminal $G_C$. In an embodiment, when the battery current $I_{CHG}$ increases to the current level $I_{CCR}$, the battery management module can enter a steady state, e.g., during a third time interval $T_{CC}$ shown in FIG. 3B. In the steady state, the sense signal $V_{SEN}$ substantially remains at the reference voltage level $V_{CCR}$, e.g., the battery current $I_{CHG}$ substantially remains at the current level $I_{CCR}$. By way of example, if the sense signal $V_{SEN}$ is greater than the reference voltage $V_{CCR}$, e.g., the battery current $I_{CHG}$ is greater than the current level $I_{CCR}$, then the regulation signal $S_{CCR}$ increases the sink current $I_{SINK}$ to be greater than the preset current $I_{SRC}$ thereby decreasing the sense signal $V_{SEN}$. If the sense signal $V_{SEN}$ is less than the reference voltage $V_{CCR}$, e.g., the battery current $I_{CHG}$ is less than the current level $I_{CCR}$, then the regulation signal $S_{CCR}$ decreases the sink current $I_{SINK}$ to be less than the preset current $I_{SRC}$ thereby increasing the sense signal $V_{SEN}$. Thus, in the steady state, the amplifier 214B can maintain the sink current at a level of the preset current $I_{SRC}$ thereby maintaining the sense signal $V_{SEN}$ at a level of the reference voltage $V_{CCR}$, e.g., maintaining the battery current $I_{CHG}$ at the current level $I_{CCR}$. In an embodiment, during a second time interval $T_{OFF2}$, the control circuit 212 can disable the sink current $I_{SINK}$ by turning on the discharge switch 234.

In the example of FIG. 3B, the average level $I_{AVE}$ of the battery current $I_{CHG}$ can be adjusted by adjusting the first time interval $T_{ON2}$, the cycle period $T_{CYC2}$ of the battery current $I_{CHG}$, and/or the reference voltage $V_{CCR}$. For examples, if the battery voltage $V_{BATT}$ increases, the control circuit 212 can increase the first time interval $T_{ON2}$, and/or reduce the cycle period $T_{CYC2}$, and/or increase the reference voltage $V_{CCR}$, thereby increasing the average level $I_{AVE}$ of the battery current $I_{CHG}$. As a result, the time for the pre-charge process in embodiments of the present invention can be less than that in the conventional pre-charge process described in relation to FIG. 1.

In an embodiment, the sense resistance $R_{SEN}$ may not be relatively small, e.g., greater than specified resistance, and therefore the sense signal $V_{SEN}$ can be high enough to control the amplifier 214B appropriately even if the battery current $I_{CHG}$ is relatively small. In one such embodiment, the battery management module 200' can operate in the abovementioned second mode, in which the battery management module 200' increases the battery current $I_{CHG}$ during the first time interval $T_{ON2}$, maintains the battery current $I_{CHG}$ at the current level $I_{CCR}$ during the third time interval $T_{CC}$, and disables the battery current $I_{CHG}$ during the second time interval $T_{OFF2}$. In an embodiment, the battery management module 200' may control the average level $I_{AVE}$ of the battery current $I_{CHG}$ more accurately in the second mode compared with in the first mode. In an embodiment, the reference current level $I_{CCR}$ (e.g., $I_{CCR}=V_{CCR}/R_{SEN}$) for the second mode is less than the reference current level $I_{COC}$ (e.g., $I_{COC}=V_{COC}/R_{SEN}$) for the first mode.

As discussed above, the battery management module 200' can selectively operate in the first mode or the second mode according to the sense resistance $R_{SEN}$. However, the invention is not so limited, and the battery management module 200' may operate in the first and second modes in parallel in another embodiment. By way of example, the comparator 214A and the amplifier 214B are enabled to perform the comparing process in parallel, and the first reference signal $V_{COC}$ is set to be greater than the second reference signal $V_{CCR}$. In an embodiment, if the battery current $I_{CHG}$ changes smoothly, then the battery current $I_{CHG}$ can be adjusted by the combined circuit of the amplifier 214B and capacitor 230. In another embodiment, if the battery current $I_{CHG}$ changes quickly, e.g., a transient current, an impulse current, or the like is presented in the battery current $I_{CHG}$, then the combined circuit of the amplifier 214B and capacitor 230 may not be able to adjust the battery current $I_{CHG}$ properly due its low-response speed. In one such embodiment, the battery current $I_{CHG}$ can be adjusted by the comparator 214A. For example, if the battery current $I_{CHG}$ increases so quickly that the amplifier 214B is unable to maintain the battery current $I_{CHG}$ at the abovementioned second reference current level $I_{CCR}$ (e.g., determined by the second reference signal $V_{CCR}$), the comparator 214A can reduce the battery current $I_{CHG}$ when the battery current $I_{CHG}$ increases to the abovementioned first reference current level $I_{COC}$. As a result, the battery current $I_{CHG}$ can be adjusted appropriately.

As mentioned above, in embodiments of the present invention, the battery management module 200' can adjust the average level $I_{AVE}$ of the battery current $I_{CHG}$ by adjusting the adjustable parameters such as the time intervals $T_{ON1}$, $T_{CYC1}$, $T_{ON2}$, $T_{CC}$, and/or $T_{CYC2}$, and/or the reference voltages $V_{COC}$ and/or $V_{CCR}$. Additionally, in embodiments of the present invention, the adjustable parameters can be adjusted based on performance parameters of the control switch 220 (e.g., a charge switch or a discharge switch) such as maximum junction temperature, junction-to-ambient factor, and maximum pulse power dissipation at room temperature. After setting the maximum allowed temperature increase for the control switch 220, the maximum allowed average power dissipation can be estimated based on the performance parameters. In an embodiment, the first time interval $T_{ON1}$ or $T_{ON2}$, or the duty cycle of the control switch 220, or the reference voltage $V_{COC}$ or $V_{CCR}$ can be set to be as large as possible as long as the average power dissipation of the control switch 220 is less than the abovementioned maximum allowed average power dissipation.

Figure 4:
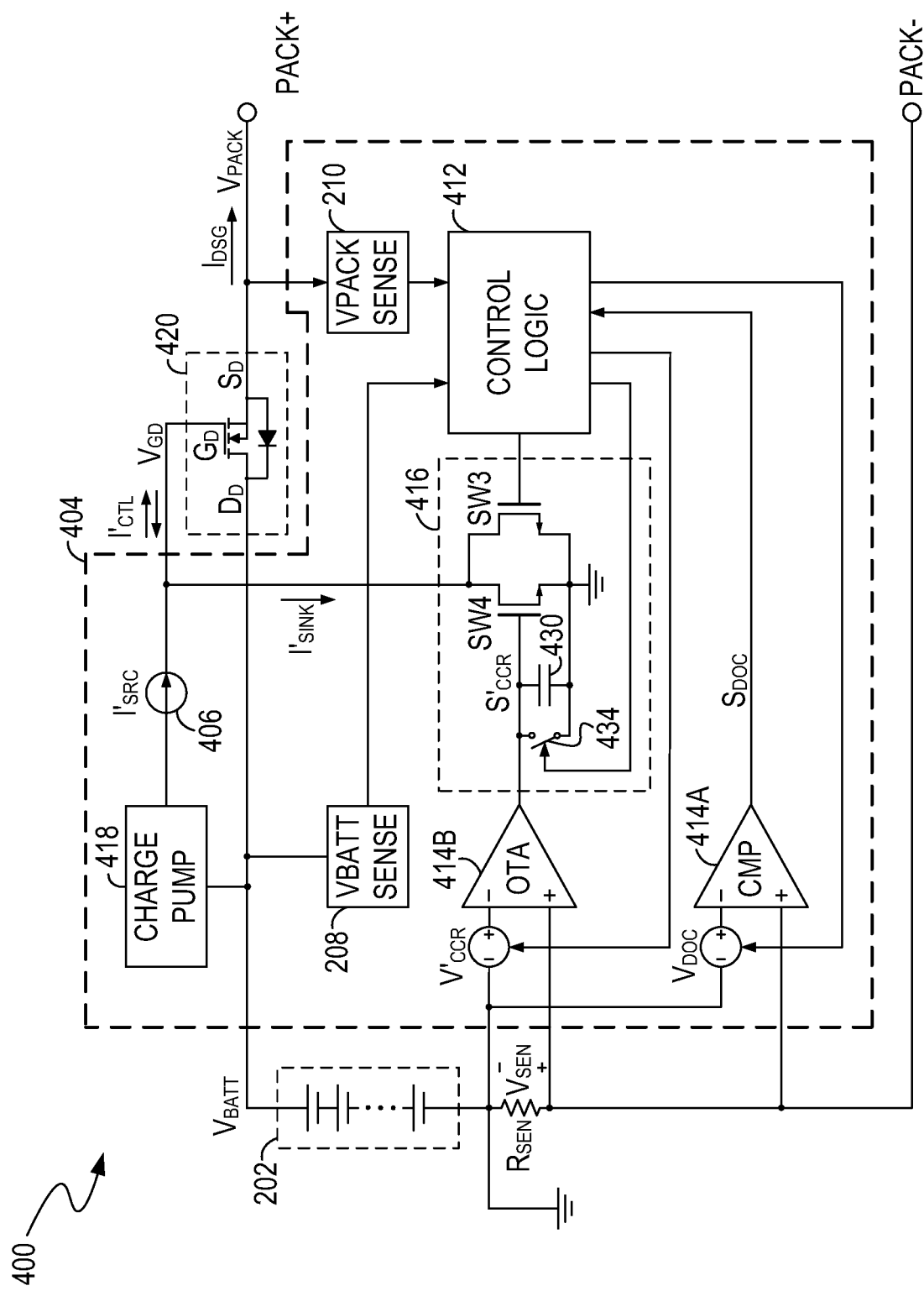
FIG. 4 illustrates an example of a battery management module topology, in an embodiment of the present invention.

FIG. 4 illustrates a topology of an example of a battery management module 400, in an embodiment of the present invention. FIG. 4 is described in combination with FIG. 2A, FIG. 2B, FIG. 3A and FIG. 3B. In the example of FIG. 4, the battery management module 400 controls a discharge switch 420 to control discharging of the battery 202, and the controlling of the discharge switch 420 is similar to the controlling of the charge switch 220 described in relation to FIG. 2A, FIG. 2B, FIG. 3A and FIG. 3B. In other words, the BMU 404, current source 406, control circuit 412, comparator 414A, amplifier 414B, current regulator 416, charge pump 418, compensation capacitor 430, discharge switch 434, third switch SW3, and fourth switch SW4 in FIG. 4 have functions similar to those of the abovementioned BMU 204, current source 206, control circuit 212, comparator 214A, amplifier 214B, current regulator 216, charge pump 218, compensation capacitor 230, discharge switch 234, first switch SW1, and second SW2, respectively.

In an embodiment, the discharge switch 420 passes a discharging current $I_{DSG}$ from the battery 202 to power a load (not shown) coupled to the terminals PACK+ and PACK−. The current regulator 416 cooperates with the current source 418 to enable the discharging current $I_{DSG}$ to flow through the battery 202 in a first time interval $T_{ON}$, disable/cutoff the discharging current $I_{DSG}$ in a second time interval $T_{OFF}$, and alternately enable and disable the discharging current $I_{DSG}$. In an embodiment, the control circuit 412 controls a ratio of the first time interval $T_{ON}$ to a sum $T_{CYC}$ of the first and second time intervals (e.g., $T_{CYC}=T_{ON}+T_{OFF}$) according to a status of the load. In another embodiment, the control circuit 412 controls the reference voltages $V_{DOC}$ and/or $V'_{CCR}$ according to the status of the load.

By way of example, the battery management module 400 can detect a status of a load coupled to the terminals PACK+ and PACK− by generating a pre-discharge current $I_{DSG}$ (e.g., a discharge current at a relatively low level) to the terminals PACK+ and PACK−. The battery management module 400 can generate the pre-discharge current $I_{DSG}$ in a manner similar to the generating of the pre-charge current $I_{CHG}$ discussed above, and control the pre-discharge current $I_{DSG}$ to be relatively small, e.g., by controlling the parameters $T_{ON}$, $T_{ON}/T_{CYC}$, $V_{DOC}$, and/or $V'_{CCR}$ to be relatively small. In an embodiment, when the pre-discharge current $I_{DSG}$ flows to the terminal PACK+, if the voltage between the terminals PACK+ and PACK− is in a predetermined voltage range, then the battery management module 400 determines that there is a load coupled to the terminals PACK+ and PACK. If the voltage is below than the voltage range, then the battery management module 400 may determine that the terminals PACK+ and PACK− are short-circuited. If the voltage is above the voltage range, then the battery management module 400 may determine that there is no load coupled to the terminals PACK+ and PACK−. In an embodiment, if the load consumes less (or larger) power, then the battery management module 400 can reduce (or increase) the pre-discharge current $I_{DSG}$ (e.g., by reducing (or increasing) the parameters $T_{ON}$, $T_{ON}/T_{CYC}$, $V_{DOC}$, and/or $V'_{CCR}$).

Figure 5:
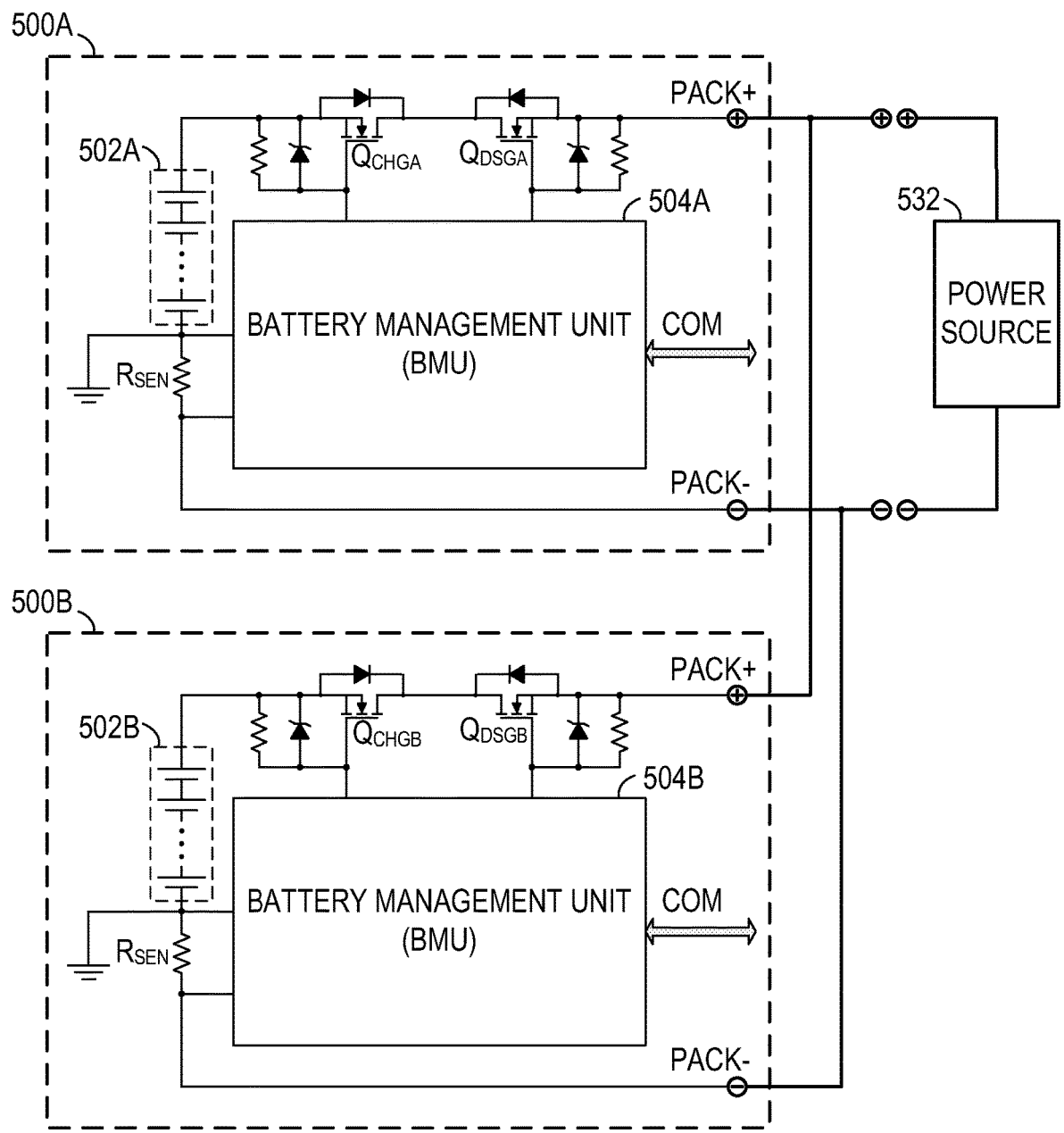
FIG. 5 illustrates an example of a battery system topology, in an embodiment of the present invention.

FIG. 5 illustrates a topology of an example of a battery system that includes multiple battery packs, in an embodiment of the present invention. FIG. 5 is described in combination with FIG. 2A, FIG. 2B, FIG. 3A, FIG. 3B, and FIG. 4. In the example of FIG. 5, only two battery packs 500A and 500B are shown. However, the invention is not so limited, and in other embodiments of the present invention, the system can include arbitrary number of battery packs. In an embodiment, the BMUs 504A and 504B can include circuits and functions similar to that of the BMU 204 and/or include circuits and functions similar to that of the BMU 404. The BMU 504A can measure a battery voltage of the battery 502A and a battery system voltage (e.g., the input voltage) from terminal PACK+ of the battery pack 500A. The BMU 504B can measure a battery voltage of the battery 502B and a battery system voltage (e.g., the input voltage) from terminal PACK+ of the battery pack 500B.

In an embodiment, the battery packs 500A and 500B are coupled in parallel, and their batteries 502A and 502B may have different voltage levels. When the battery packs 500A and 500B are charged by a power source 532 (e.g., a charger) or when the battery packs 500A and 500B discharge to power a load, if their charge switches $Q_{CHGA}$ and $Q_{CHGB}$ and discharge switches $Q_{DSGA}$ and $Q_{DSGB}$ are fully turned on, then a large current may flow between the battery packs 500A and 500B and it may destroy the circuits in the battery packs 500A and 500B. Advantageously, the BMU 504A and/or the BMU 504B can partially turn on the switches to generate a pre-charge current $I_{CHG}$ or a pre-discharge current $I_{DSG}$, and control the current $I_{CHG}$ or $I_{DSG}$ to be relatively small. As a result, the battery packs 500A and 500B can be protected.

In an embodiment, assume that the power source 532 is not connected, and a new battery pack (e.g., the battery pack 500B) is plugged in the battery system which includes battery 500A or more battery packs. If a battery voltage of the battery 502A is greater than a battery voltage of the battery 502B, then the battery pack 500B can be set in a pre-charge mode to increase its battery voltage until the battery voltage of the battery 502B is substantially equal with the battery voltage of the battery 502A. The pre-charge current is regulated and controlled by the BMU 504B. If a battery voltage of the battery 502A is less than a battery voltage of the battery 502B, the battery pack 500B can be set in a pre-discharge mode to decrease its battery voltage until the battery voltage of the battery 502B is substantially equal with the battery voltage of the battery 502A. The pre-discharge current is regulated and controlled by the BMU 504B.

In another embodiment, assume that the power source 532 is connected, and a new battery pack (e.g., the battery pack 500B) is connected to the battery system which includes battery 500A or more battery packs, the voltage of the power source 532 is higher than the battery voltage of the battery 502A and battery 502B. In this case, both the battery pack 500A and the battery pack 500B are set in a charge mode. If the battery voltage of the battery 502A is greater than a battery voltage of the battery 502B, then the BMU 504A regulates the charge current of the battery 502A, and the BMU 504B regulates the charge current of the battery 502B, such that the charge current of the battery 502A is less than the charge current of the battery 502B. Consequently, the battery 502B is charged faster to achieve balance between the battery packs.

Additionally, in yet another embodiment, in a charging process in which the power source 532 provides power to the terminals PACK+ and PACK−, if the voltage of the battery 502A is greater than the voltage of the battery 502B, then the BMU 504B fully turns on the charge switch $Q_{CHGB}$, and the BMU 504A partially turns on the discharge switch $Q_{DSGA}$ to generate a pre-discharge current. The pre-discharge current, together with the current from the power source 532, can flow to charge the battery 502B, so as to balance the batteries 502A and 502B. By way of another example, in a discharging process in which the battery packs 500A and 500B provide power to a load, if the voltage of the battery 502A is greater than the voltage of the battery 502B, then the BMU 504A fully turns on the discharge switch $Q_{DSGA}$, and the BMU 504B partially turns on the charge switch $Q_{CHGB}$ to allow a pre-charge current from the battery 502A to charge the battery 502B, so as to balance the batteries 502A and 502B. In yet other examples, when the battery packs 500A and 500B are neither charged by a power source nor discharging to power a load, if the voltage of the battery 502A is greater than the voltage of the battery 502B, then the BMU 504A can partially turn on the discharge switch $Q_{DSGA}$ to generate a pre-discharge current, and the BMU 504B can fully turn on the charge switch $Q_{CHGB}$ to allow the battery 502B to be charged by the pre-discharge current from the battery 502A; or the BMU 504A can fully turn on the charge switch $Q_{CHGA}$ and the discharge switch $Q_{DSGA}$ and the BMU 504B can partially turn on the charge switch $Q_{CHGB}$ to allow a pre-charge current from the battery 502A to charge the battery 502B. As a result, the batteries 502A and 502B can be balanced with each other.

Figure 6:
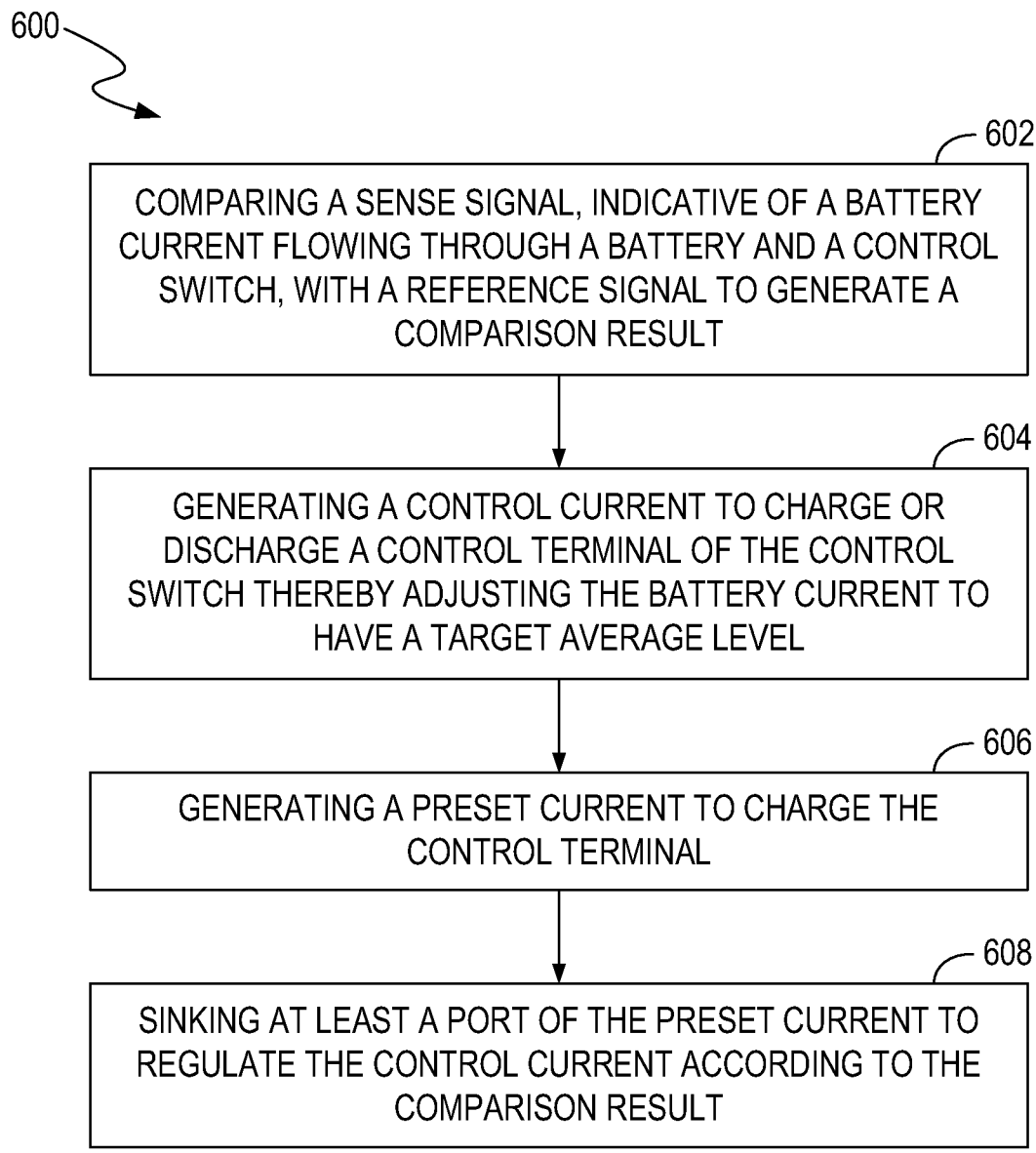
FIG. 6 illustrates a flowchart of examples of operations performed by a battery management module, in an embodiment of the present invention.

FIG. 6 illustrates a flowchart of examples of operations performed by a battery management module, e.g., 200, 200', 400, or 500, in an embodiment of the present invention. FIG. 6 is described in combination with FIG. 2A, FIG. 2B, FIG. 3A, FIG. 3B, FIG. 4, and FIG. 5.

In block 602, the comparison circuitry 214 compares the sense signal $V_{SEN}$, indicative of a battery current (e.g., a charging current $I_{CHG}$ or a discharging current $I_{DSG}$) flowing through the battery 202 and a control switch (e.g., 220 or 410), with a reference signal (e.g., $V_{COC}$, $V_{CCR}$, $V_{DOC}$, or $V_{CCR}$) to generate a comparison result (e.g., $S_{COC}$, $S_{CCR}$, $S_{DOC}$, or $S'_{CCR}$).

In block 604, the current generating circuitry 238 generates a control current $I_{CTL}$ to charge or discharge a control terminal (e.g., gate terminal $G_C$ or $G_D$) of the control switch thereby adjusting the battery current to have a target average level.

In block 606, the current source (e.g., 206 or 406) generates a preset current to charge the control terminal.

In block 608, the current regulator (e.g., 216 or 416) sinks at least a portion of the preset current to regulate the control current according to the comparison result.

Figure 7:
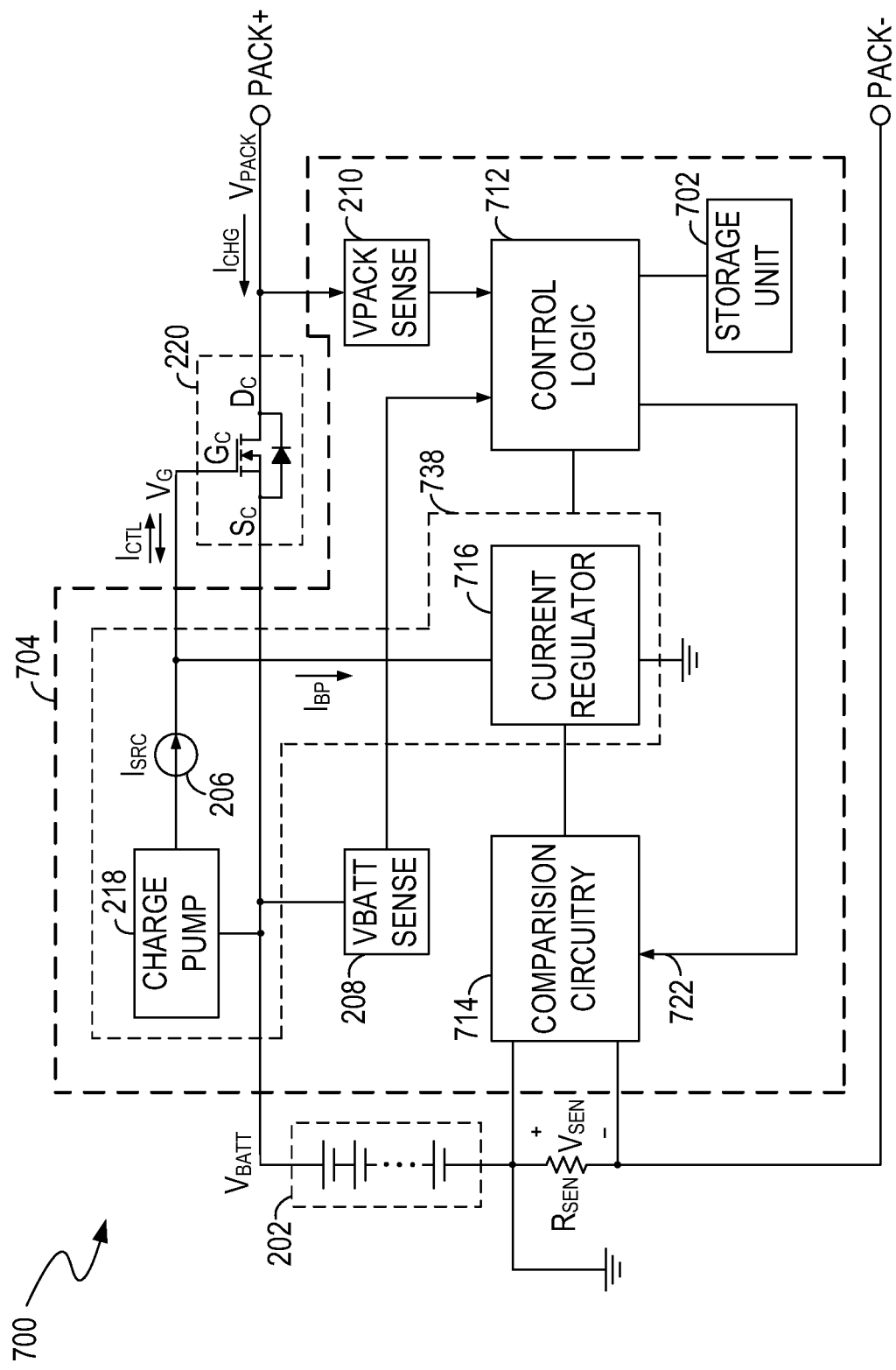
FIG. 7 illustrates an example of a battery management module topology, in an embodiment of the present invention.

FIG. 7 illustrates a topology of an example of a battery management module 700, in an embodiment of the present invention. Elements labeled the same in FIG. 2A have similar functions. The battery management module 700 can be integrated in a battery pack.

In an embodiment, the battery management module 700 includes a battery 202, a control switch 220 (e.g., a charge switch in the examples of FIGS. 7 and 8 or a discharge switch in the example of FIG. 9), a current sense element (e.g., including a resistor $R_{SEN}$) and a battery management unit (BMU) 704. The BMU 704 includes voltage sense circuitry, a storage unit 702, a control circuit 712 and a current regulation circuitry. In the example of FIG. 7, the control switch 220, e.g., a charge switch, can pass a battery current $I_{CHG}$, e.g., a pre-charging current, from the input terminal PACK+ to the battery 202 if an input voltage at the input terminal PACK+ is greater than the battery voltage $V_{BATT}$ of the battery 202. The current sense element provides a sense signal $V_{SEN}$ indicative of the battery current $I_{CHG}$. The voltage sense circuitry includes a battery-voltage sense circuit 208 for sensing the battery voltage $V_{BATT}$ at an electrode (e.g., the anode) of the battery 202 and an input-voltage sense circuit 210 for sensing an input voltage $V_{PACK}$ at a power terminal (e.g., PACK+) of the battery pack. The storage unit 702 can store attribute data associated with the battery pack. The attribute data can include parameters of the control switch 220 such as drain-to-source on-state resistance (Rdson), maximum allowed DC power, maximum pulse power, package type and thermal resistance. The attribute data can also include parameters of the printed circuit board (PCB) implementing the BMU 704 such as the PCB layout property and thermal performance. The storage unit 702 can be implemented inside the battery pack or outside of the battery pack. If the storage unit 702 is outside of the battery pack, the data stored in it can be accessed by the control circuit 712 through a communication interface. The control circuit 712, coupled to the voltage sense circuitry and the storage unit 702, is operable for adjusting a level of a reference signal 722 based on the attribute data stored in the storage unit 702 and a difference between the battery voltage $V_{BATT}$ and the input voltage $V_{PACK}$ sensed by the voltage sense circuitry. The level of the reference signal 722 can determine a target level of the battery current $I_{CHG}$. The current regulation circuitry is operable for controlling the control switch 220 to regulate the battery current $I_{CHG}$ flowing through the control switch 220 and the battery 202 according to the reference signal. In the example of FIG. 7, the current regulation circuitry includes a comparison circuitry 714 and current generating circuitry 738.

The comparison circuitry 714 can compare the sense signal $V_{SEN}$ with the reference signal 722 to generate a comparison result. The current generating circuitry 738 can generate a control current $I_{CTL}$, according to the comparison result, to charge or discharge a control terminal $G_C$ of the control switch 220 thereby adjusting the battery current $I_{CHG}$ to have a target average level. The control switch 220 includes a field-effect transistor, e.g., a metal-oxide semiconductor field-effect transistor, and the control terminal $G_C$ includes a gate terminal of the field-effect transistor. The control current $I_{CTL}$ can charge the gate terminal $G_C$ to increase the gate voltage $V_G$ of the control switch 220 to partially turn on the switch 220, thereby increasing the battery current $I_{CHG}$. The control current $I_{CTL}$ can also discharge the gate terminal $G_C$ to reduce the gate voltage $V_G$ thereby to reduce or cutoff the battery current $I_{CHG}$. Thus, the battery current $I_{CHG}$ can be adjusted by adjusting the control current $I_{CTL}$. The abovementioned comparison result can be provided to the current generating circuitry 738 to adjust the control current $I_{CTL}$ such that the battery current $I_{CHG}$ is adjusted accordingly.

In an embodiment, the current generating circuitry 738 includes a current source 206, a charge pump 218, and a current regulator 716. The current source 206 can generate a preset current $I_{SRC}$ to charge the control terminal $G_C$. The charge pump 218 can provide a supply voltage to power the current source 206. The control circuit 712 can connect the control terminal $G_C$ to the supply voltage provided by the charge pump 218 to fully turn on the control switch 220, or connect the control terminal $G_C$ to the current source 206 to partially turn on the control switch 220. If the control switch 220 is partially turned on (e.g., operated in a linear mode), the current regulator 716 can sink at least a portion of the preset current $I_{SRC}$ to regulate the control current $I_{CTL}$ according to the comparison result from the comparison circuitry 714. In an embodiment, if the battery current $I_{CHG}$ decreases below a threshold, the control circuit 712 fully turns on the control switch 220.

Figure 8:
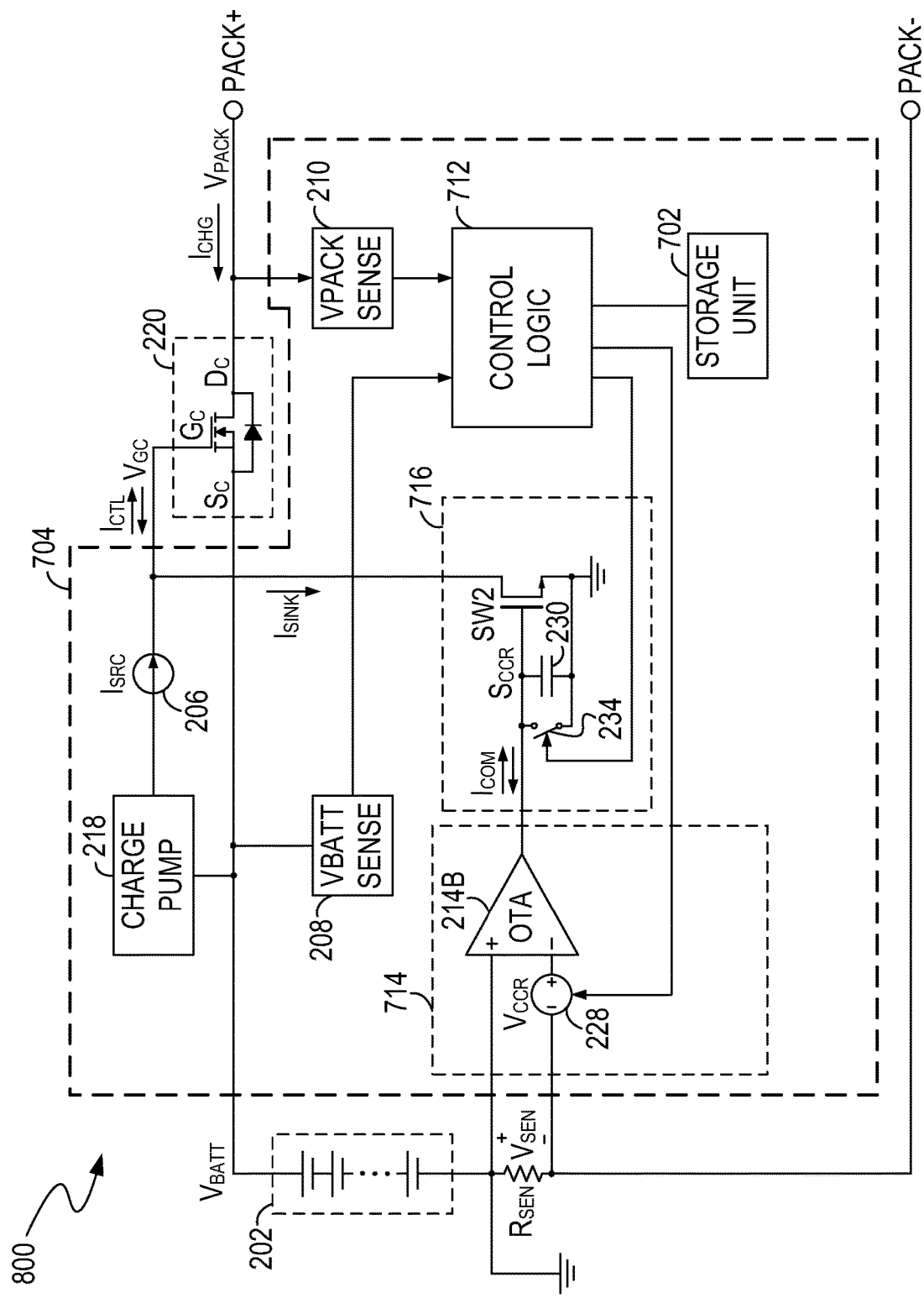
FIG. 8 illustrates an example of a battery management module topology, in an embodiment of the present invention.

FIG. 8 illustrates circuit diagrams of examples of the current regulator 716 and the comparison circuitry 714, in an embodiment of the present invention. Elements labeled the same in FIG. 2B have similar functions. As shown in FIG. 8, the current regulator 716 includes a switch SW2 (e.g., including a metal-oxide-semiconductor field-effect transistor), a compensation capacitor 230, and a discharge switch 234. The comparison circuitry 714 includes an amplifier 214B and reference voltage source 228. The voltage source 228 provides a reference signal $V_{CCR}$ under control of the control circuit 712, and the amplifier 214B generates a compensation current $I_{COM}$, according to a difference between the sense signal $V_{SEN}$ and the reference signal $V_{CCR}$, to charge or discharge the compensation capacitor 230 to control a regulation signal $S_{CCR}$. The regulation signal $S_{CCR}$ can also be controlled by turning on the discharge switch 234. The regulation signal $S_{CCR}$ includes a voltage on the capacitor 230 that controls a gate-source voltage of the switch SW2.

The control circuit 712, the current regulator 716 and the comparison circuitry 714 regulate the battery current $I_{CHG}$ in a similar way as the second mode of the battery management module 200' of FIG. 2B. By adjusting a level of the reference signal $V_{CCR}$ according to the attribute data and the difference between the battery voltage $V_{BATT}$ and the input voltage $V_{PACK}$, the control circuit 712 can regulate a battery current to avoid large current surge. In an embodiment, the control circuit 712 adjusts the reference signal $V_{CCR}$ to maximize the battery current within a safe range which is determined by the attribute data, so as to shorten the balancing time while preventing the circuitry from being damaged. Furthermore, the control circuit 712 can increase the reference signal $V_{CCR}$ if the difference between the battery voltage $V_{BATT}$ and the input voltage $V_{PACK}$ decreases.

Similar to the embodiment described in FIG. 3B, besides of adjusting the reference signal $V_{CCR}$, the battery management module 800 can further adjust the time interval $T_{ON2}$ during which the control switch 200 is on and/or duty cycle of the control switch 220 to adjust an average level of the battery current $I_{CHG}$.

Figure 9:
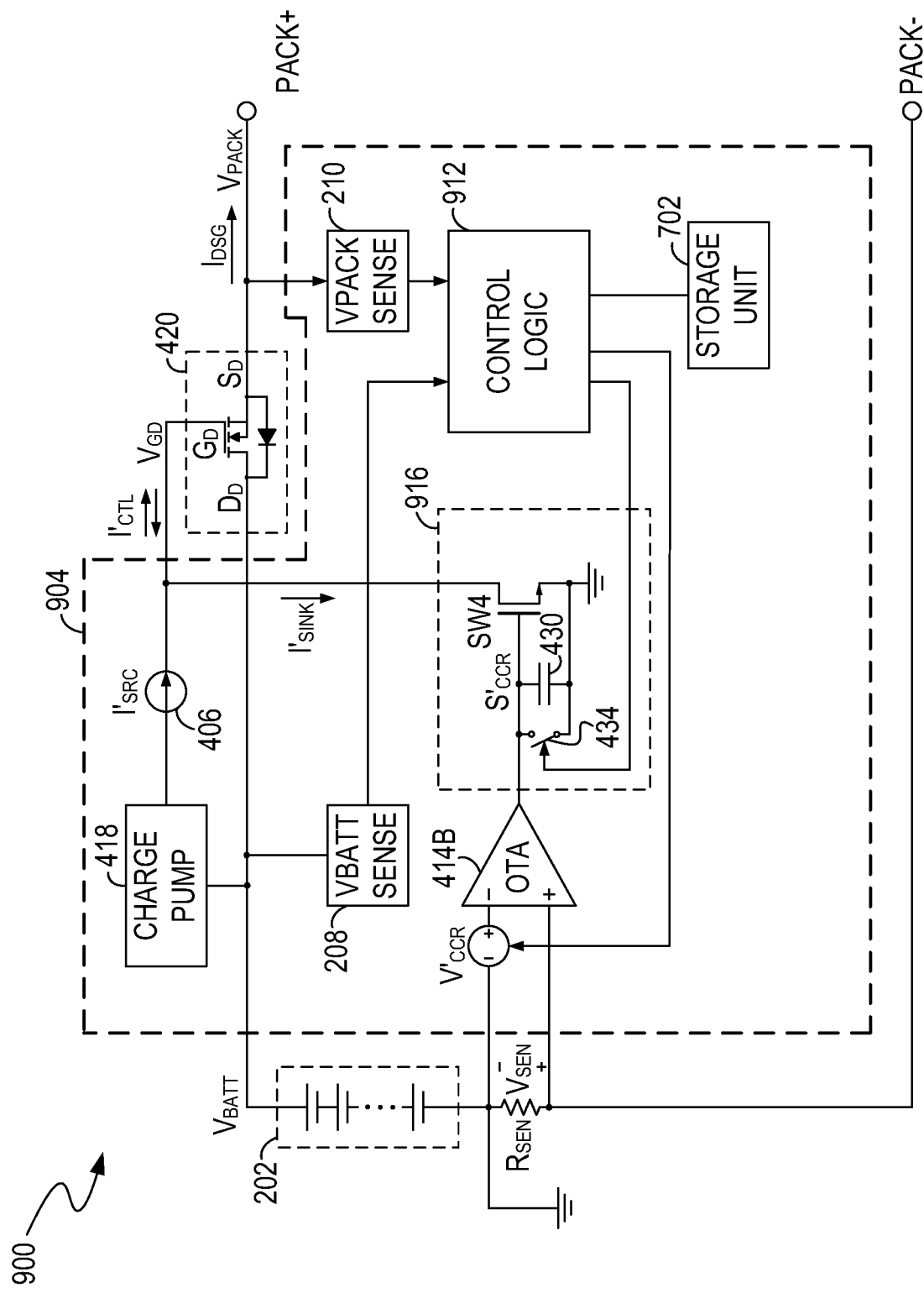
FIG. 9 illustrates an example of a battery management module topology, in an embodiment of the present invention.

FIG. 9 illustrates a topology of an example of a battery management module 900, in an embodiment of the present invention. Elements labeled the same in FIGS. 4 and 9 have similar functions. In the example of FIG. 9, the battery management module 900 controls a discharge switch 420 to control discharging of the battery 202. The discharge switch 420 can pass a battery current $I_{DSG}$, e.g., a pre-discharging current, from the battery 202 to the terminal PACK+ if an input voltage at the terminal PACK+ is less than the battery voltage $V_{BATT}$ of the battery 202. The controlling of the discharge switch 420 is similar to the controlling of the charge switch 220 described in FIG. 8. The BMU 904, current source 406, control circuit 912, amplifier 414B, current regulator 916, charge pump 418, compensation capacitor 430, discharge switch 434, and switch SW4 in FIG. 9 have functions similar to those of the abovementioned BMU 704, current source 206, control circuit 712, amplifier 214B, current regulator 716, charge pump 218, compensation capacitor 230, discharge switch 234 and switch SW2, respectively.

It can be understood that, besides of the examples in FIGS. 7-9, other approaches can be utilized to control the control switch 220. For example, in an embodiment, a battery management module can include a comparison circuitry (e.g., amplifier) that compares a sensing signal indicative of the battery current and a reference signal indicative of a target level of the battery current to output a comparison result (e.g., a voltage signal). A level of the voltage signal varies with the difference between the sensing signal and the reference signal. The control switch is controlled in a linear mode according to the voltage signal. As a result, the battery current flowing through the control switch is regulated accordingly.

In the examples in FIG. 7-9, the control switches are implemented by N-channel metal-oxide semiconductor field-effect transistor (NMOSFET) coupled between anode of the battery 202 and the positive terminal PACK+ of the battery pack. In other embodiments, control switches can be implemented by NMOSFET coupled between cathode of the battery 202 and the negative terminal PACK− of the battery pack.

Figure 10:
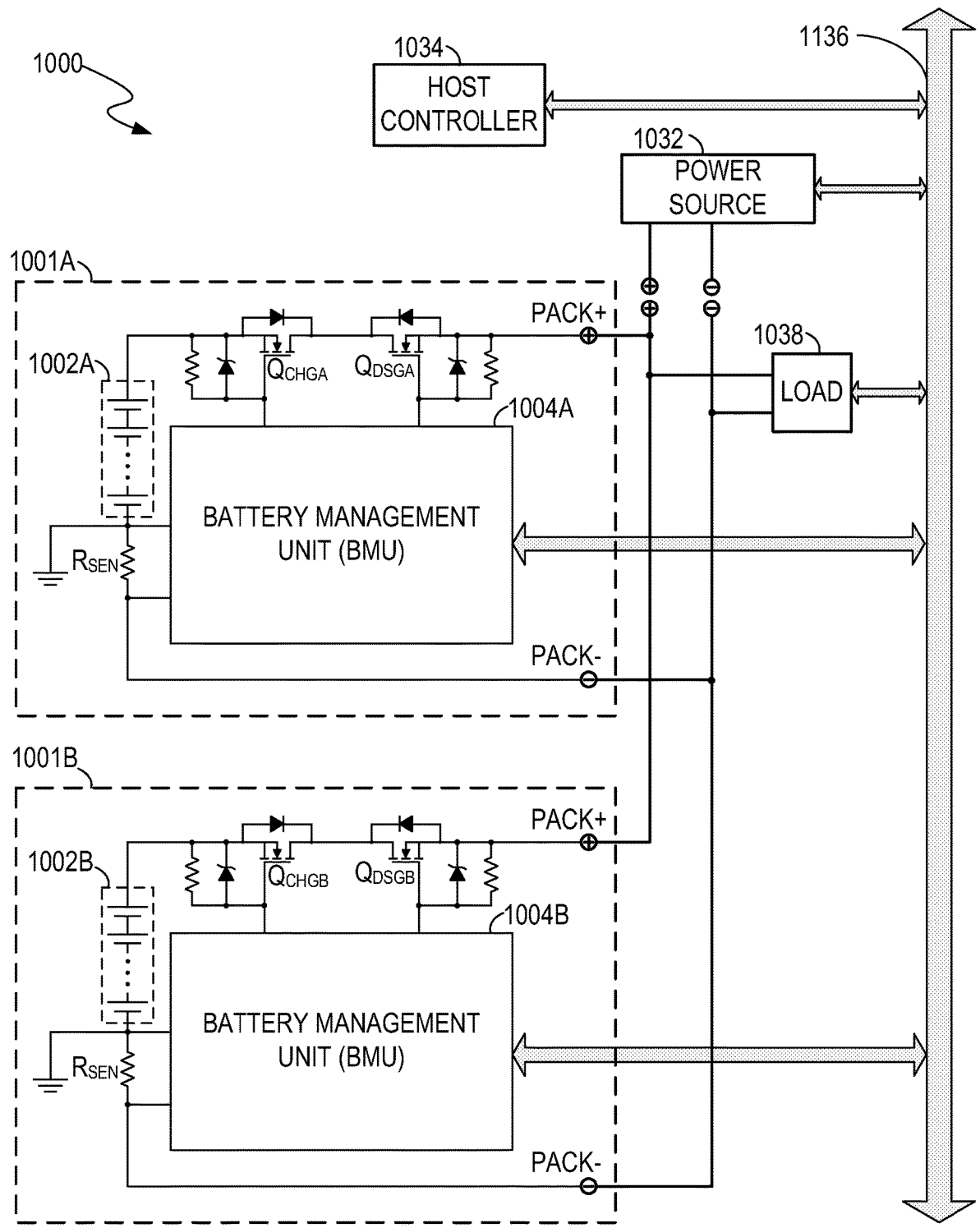
FIG. 10 illustrates an example of an expandable battery system, in an embodiment of the present invention.

FIG. 10 illustrates a topology of expandable battery system 1000 that includes multiple battery packs, in an embodiment of the present invention. FIG. 10 is described in combination with FIGS. 7-9. In the example of FIG. 10, only two battery packs 1001A and 1001B are shown. However, the invention is not so limited, and in other embodiments of the present invention, the system can include arbitrary number of battery packs. In an embodiment, the BMUs 1004A and 1004B can include circuits and functions similar to that of the BMU 704 and/or include circuits and functions similar to that of the BMU 904.

The expandable battery system 1000 can be an energy storage system (ESS), an uninterruptible power supply (UPS) or a power tool, etc. In a conventional expandable battery system, bi-directional DC/DC converters may be used to avoid large current surge among battery packs caused by voltage difference between battery packs during hot-swap plug-in. However, using bi-directional DC/DC converters not only increases cost but also reduces reliability. In contrast, the expandable battery system 1000 according to present invention provides a low-cost and reliable solution to regulate the current between battery and to avoid the large current surge.

Assume that initially the battery pack 1001A is in operation and its charge switch $Q_{CHGA}$ and discharge switch $Q_{DSGA}$ are fully turned on. In order to expand the total capacity of the battery system 1000, the battery pack 1001B is planned to be assembled (plugged in) with the battery pack 1001A. The charge switch $Q_{CHGB}$ and discharge switch $Q_{DSGB}$ of the battery pack 1001B are turned off first. After being connected with the battery pack 1001A, the battery pack 1001B senses an input voltage $V_{PACK}$ at the terminal PACK+ and a battery voltage $V_{BATT2}$ of the battery 1002B. The input voltage $V_{PACK}$ is determined by the battery voltage of the battery 1002A in the battery pack 1001A.

If the battery voltage $V_{BATT2}$ is less than the input voltage $V_{PACK}$, the BMU 1004B partially turn on the charge switch $Q_{CHGB}$ and controls the charge switch $Q_{CHGB}$ in a linear mode. More specifically, a control circuit in the BMU 1004B adjusts a level of a reference signal based on a difference between the battery voltage $V_{BATT2}$ and the input voltage $V_{PACK}$ and based on attribute data associated with the battery pack 1001B. The attribute data is pre-stored in a storage unit. The level of the reference signal can determine a target level of the battery current which flows from the terminal PACK+ through the charge switch $Q_{CHGB}$ to the battery 1002B. Accordingly, the battery 1002B is charged by a regulated current. The control circuit controls the charge switch $Q_{CHGB}$ to regulate the battery current according to the reference signal. As a result, large current surge between battery pack 1001A and battery pack 1001B can be avoided, and battery pack 1001A and battery pack 1001B can be balanced. In an embodiment, the control circuit increases the reference signal if the difference between the battery voltage $V_{BATT2}$ and the input voltage $V_{PACK}$ decreases. If the battery current, which is sensed by a current sense element in the BMU 1004B, decreases below a threshold, it indicates that two battery packs have been balanced. In such situation, the BMU 1004B can fully turn on the charge switch $Q_{CHGB}$ and the discharge switch $Q_{DSGB}$ of the battery pack 1001B to enable normal operation of the battery pack 1001B.

If the battery voltage $V_{BATT2}$ is greater than the input voltage $V_{PACK}$, the BMU 1004B partially turn on the discharge switch $Q_{DSGB}$ and controls the discharge switch $Q_{DSGB}$ in a linear mode. More specifically, a control circuit in the BMU 1004B adjusts a level of a reference signal based on a difference between the battery voltage $V_{BATT2}$ and the input voltage $V_{PACK}$ and based on attribute data associated with the battery pack 1001B. The attribute data is pre-stored in a storage unit. The level of the reference signal can determine a target level of the battery current which flows from the battery 1002B through the discharge switch $Q_{DSGB}$ to the terminal PACK+. Accordingly, the battery 1002B is discharged by a regulated current. The control circuit controls the discharge switch $Q_{DSGB}$ to regulate the battery current according to the reference signal. As a result, large current surge between battery pack 1001A and battery pack 1001B can be avoided, and battery pack 1001A and battery pack 1001B can be balanced. In an embodiment, the control circuit increases the reference signal if the difference between the battery voltage $V_{BATT2}$ and the input voltage $V_{PACK}$ decreases. If the battery current, which is sensed by a current sense element in the BMU 1004B, decreases below a threshold, it indicates that two battery packs have been balanced. In such situation, the BMU 1004B can fully turn on the charge switch $Q_{CHGB}$ and the discharge switch $Q_{DSGB}$ of the battery pack 1001B to enable normal operation of the battery pack 1001B.

In an embodiment, the expandable battery system 1000 further includes a host controller 1034 and a system power source (e.g., a charger) 1032. The system power source 1032 can provide power to the system 1000 and a load 1038. The battery packs 1001A and 1001B, the load 1038 and the host controller 1034 are all coupled to a communication line, (e.g., a bus) 1136. The host controller 1034 can receive data from the battery packs and send command to control the battery pack via the communication line 1136. For example, the host controller 1034 can send commands to a battery pack to adjust a charge current or a discharge current, or to enable or disable a battery pack to charge or discharge. Advantageously, charge current and discharge current of each battery pack can be controlled according to attribute data associated with each battery pack, the power status of the power source 1032, status of each battery pack and status of the load to achieve safe and efficient operation of the system 1000.

Figure 11:
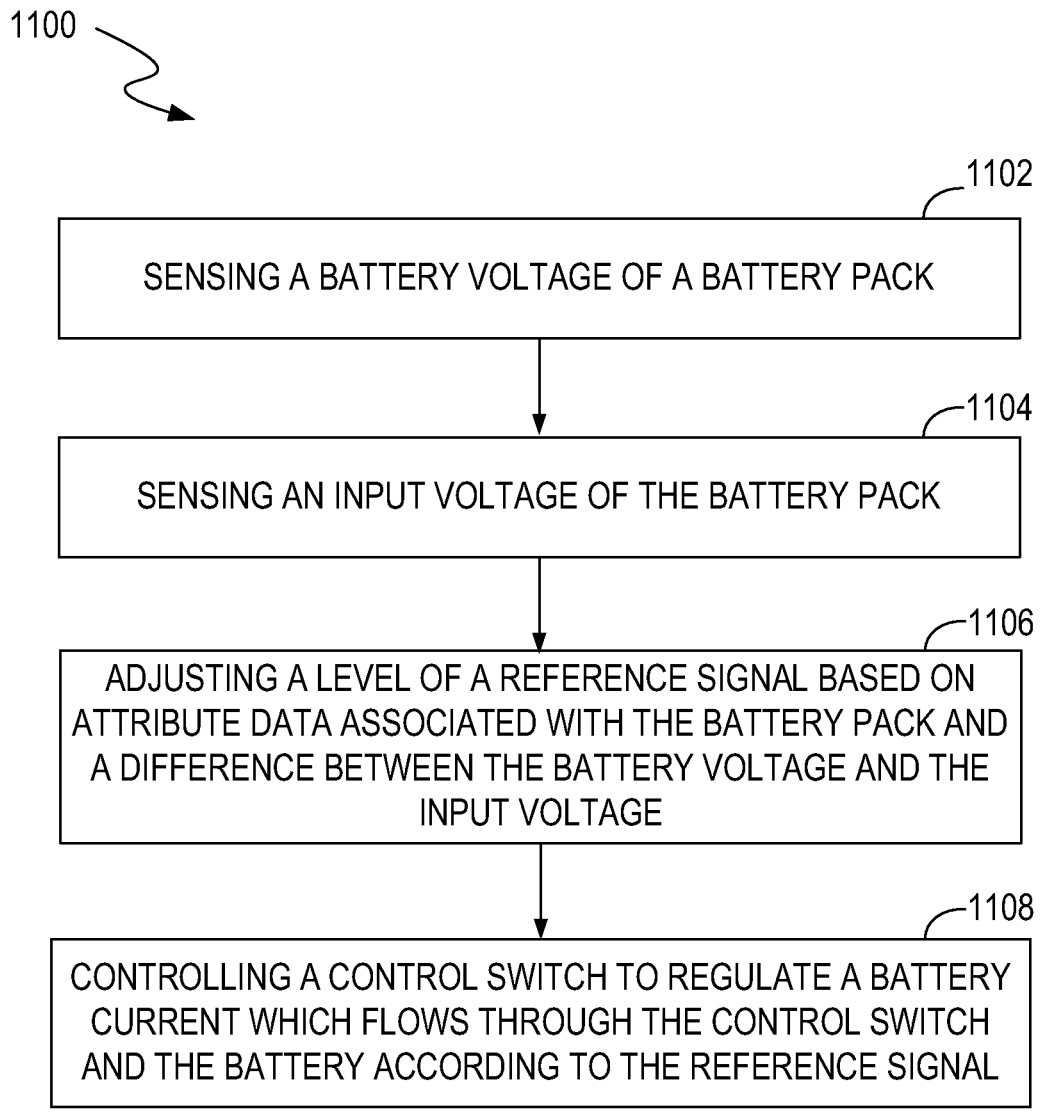
FIG. 11 illustrates a flowchart of examples of operations performed by a battery management module, in an embodiment of the present invention.

FIG. 11 illustrates a flowchart of examples of operations performed by a battery management module, e.g., 700, 800, 900, in an embodiment of the present invention. FIG. 11 is described in combination with FIGS. 7-9.

In block 1102, voltage sense circuitry senses a battery voltage $V_{BATT}$ of a battery 202 in the battery pack.

In block 1104, voltage sense circuitry senses an input voltage $V_{PACK}$ of the battery pack.

In block 1106, a control circuit (e.g., 712 or 912) adjusts a level of a reference signal based on attribute data associated with a battery pack and a difference between the battery voltage $V_{BATT}$ and the input voltage $V_{PACK}$. In another embodiment, if a battery system (e.g., the expandable battery system 1000) includes a host controller (e.g., 1034), the host controller can over-write the decision from each battery pack. In other words, in such embodiment, a level of a reference signal is adjusted by the host controller, rather than the control circuit inside a battery pack. The level of the reference signal can be adjusted by the host controller based on attribute data associated with the battery pack, status of a system power source, status of a load and status of the battery pack. The host controller can transmit commands to each battery pack through a communication line (e.g., a bus) to adjust the reference signal. The host controller can also transmit command to each battery pack to turn on or turn off a control switch (e.g., a charge switch and/or a discharge switch).

In block 1108, current regulation circuitry controls the control switch to regulate the battery current which flows through the control switch and the battery according to the reference signal.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

I claim:

1. A battery management module comprising:
   comparison circuitry that compares a sense signal, indicative of a battery current flowing through a battery and a control switch, with a reference signal to generate a comparison result;
   a current source that generates a preset current to charge a control terminal of said control switch; and
   a current regulator, coupled to said comparison circuitry and said current source, that sinks at least a portion of said preset current to control charging and discharging of said control terminal according to said comparison result, thereby adjusting said battery current to a target average level,
   wherein said preset current charges said control terminal if said battery current is in a range determined by said reference signal, wherein said current regulator sinks said preset current to terminate charging of said control terminal if said battery current is outside of said range, and wherein said battery management module further comprises a control circuit that adjusts said reference signal thereby adjusting said target average level.

2. The battery management module of claim 1, wherein said control switch comprises a field-effect transistor, and said control terminal comprises a gate terminal of said field-effect transistor, and wherein said preset current charges said gate terminal to increase a gate voltage of said field-effect transistor thereby increasing said battery current.

3. The battery management module of claim 1, wherein said current regulator comprises a first switch, coupled to said control terminal, that sinks said preset current and discharges said control terminal when said first switch is turned on, and wherein said comparison circuitry turns on said first switch if said sense signal is greater than said reference signal.

4. The battery management module of claim 1, wherein said current regulator comprises a first switch, coupled to said control terminal, that passes a sink current to sink at least a portion of said preset current under control of a regulation signal, and wherein said comparison circuitry comprises an amplifier that generates a compensation current, according to a difference between said sense signal and said reference signal, to control charging and discharging of a compensation capacitor, coupled to said first switch, to control said regulation signal.

5. The battery management module of claim 4, wherein said amplifier reduces said sink current if said sense signal is less than said reference signal, increases said sink current if said sense signal is greater than said reference signal, and otherwise maintains said sink current at a level of said preset current thereby maintaining said sense signal at a level of said reference signal.

6. The battery management module of claim 1, wherein said current regulator cooperates with said current source to enable said battery current to flow through said battery in a first time interval by charging said control terminal, disable said battery current in a second time interval by discharging said control terminal, and alternately enable and disable said battery current.

7. The battery management module of claim 6, wherein said control switch comprises a charge switch that passes a charging current from a power source to charge said battery, and wherein said control circuit also increases a ratio of said first time interval to a sum of said first and second time intervals if a voltage of said battery increases.

8. The battery management module of claim 6, wherein said control switch comprises a discharge switch that passes a discharging current from said battery to power a load, and wherein said control circuit also controls a ratio of said first time interval to a sum of said first and second time intervals according to a status of said load.

9. The battery management module of claim 1, wherein said control circuit increases said reference signal to increase said target average level if a voltage of said battery increases.

10. A method comprising:
   comparing, using comparison circuitry, a sense signal, indicative of a battery current flowing through a battery and a control switch, with a reference signal to generate a comparison result;
   generating a preset current to charge a control terminal of said control switch;
   sinking, using a current regulator, at least a portion of said preset current to control charging and discharging of said control terminal according to said comparison result; and
   adjusting said battery current to a target average level by said sinking of said at least a portion of said preset current,
   wherein said method further comprises:
   charging, using said preset current, said control terminal if said battery current is in a range determined by said reference signal;
   terminating charging of said control terminal by sinking, using said current regulator, said preset current if said battery current is outside of said range; and
   adjusting said reference signal thereby adjusting said target average level.

11. The method of claim 10, wherein said control switch comprises a field-effect transistor, and said control terminal comprises a gate terminal of said field-effect transistor, and wherein said method further comprises:
   increasing said battery current by using said preset current to charge said gate terminal to increase a gate voltage of said field-effect transistor.

12. The method of claim 10, wherein said current regulator comprises a first switch coupled to said control terminal, and wherein said method further comprises:
   sinking said preset current to discharge said control terminal by turning on said first switch; and
   turning on said first switch if said sense signal is greater than said reference signal.

13. The method of claim 10, wherein said current regulator comprises a first switch coupled to said control terminal, and wherein said method further comprises:
   generating, using an amplifier in said comparison circuitry, a compensation current according to a difference between said sense signal and said reference signal;
   controlling, using said compensation current, charging and discharging of a compensation capacitor, coupled to said first switch, to control a regulation signal on said compensation capacitor; and
   turning on said first switch to pass a sink current to sink at least a portion of said preset current under control of said regulation signal.

14. The method of claim 13, further comprising:
   reducing said sink current if said sense signal is less than said reference signal;
   increasing said sink current if said sense signal is greater than said reference signal; and
   if not reducing said sink current and if not increasing said sink current, then maintaining said sink current at a level of said preset current thereby maintaining said sense signal at a level of said reference signal.

15. A battery pack comprising:
   a battery;
   a control switch, coupled to said battery pack, that allows a battery current of said battery to flow through;
   a current source, coupled to said battery and said control switch, that generates a preset current to charge a control terminal of said control switch; and
   a current regulator, coupled to said current source, that is controlled by a comparison result of comparison between said battery current and a reference signal, and that sinks at least a portion of said preset current to control charging and discharging of said control terminal according to said comparison result, thereby adjusting said battery current to a target average level,
   wherein said preset current charges said control terminal if said battery current is in a range determined by said reference signal, wherein said current regulator sinks said preset current to terminate charging of said control terminal if said battery current is outside of said range, and wherein said battery pack further comprises a control circuit that adjusts said reference signal thereby adjusting said target average level.

16. The battery pack of claim 15, wherein said control switch comprises a field-effect transistor, and said control terminal comprises a gate terminal of said field-effect transistor, and wherein said preset current charges said gate terminal to increase a gate voltage of said field-effect transistor thereby increasing said battery current.

17. The battery pack of claim 15, wherein said current regulator comprises a first switch, coupled to said control terminal, that sinks said preset current and discharges said control terminal when said first switch is turned on, and wherein said comparison result causes said first switch to be turned on if said sense signal is greater than said reference signal.

18. The battery pack of claim 15, wherein said current regulator comprises a first switch, coupled to said control terminal, that passes a sink current to sink at least a portion of said preset current under control of a regulation signal, and wherein said battery pack comprises an amplifier, coupled to said current regulator, that generates a compensation current, according to a difference between said sense signal and said reference signal, to control charging and discharging of a compensation capacitor, coupled to said first switch, to control said regulation signal.

19. The battery pack of claim 18, wherein said amplifier is operable for: reducing said sink current if said sense signal is less than said reference signal, increasing said sink current if said sense signal is greater than said reference signal, and maintaining said sink current at a level of said preset current thereby maintaining said sense signal at a level of said reference signal.

\* \* \* \* \*